Inventor:
Helmut Plate

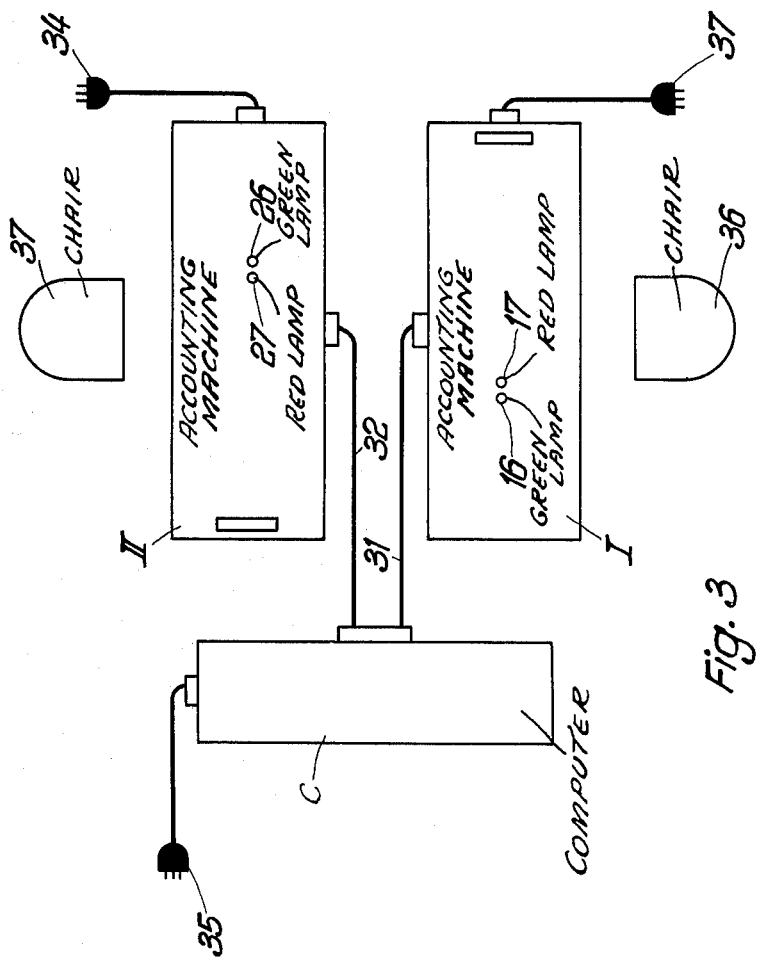

United States Patent Office 3,258,747
Patented June 28, 1966

3,258,747
CONTROL SYSTEM FOR SELECTIVE CONNECTION OF BUSINESS MACHINES WITH AN ELECTRONIC COMPUTER
Helmut Plate, Bielefeld, Germany, assignor to Anker-Werke Aktiengesellschaft, Bielefeld, Germany, a corporation of Germany
Filed Mar. 1, 1961, Ser. No. 92,561
Claims priority, application Germany, Mar. 3, 1960,
A 34,121
3 Claims. (Cl. 340—172.5)

My invention relates to an electric control system for mutually exclusive connection of two or more business machines with a single electronic computer cooperating with the machines.

Accounting and other business machines of the type equipped with data entering and data processing mechanisms require considerably more time for performing a machine run or a sequence of interrelated registering and accounting operations, than is required for an electronic computer, cooperating with such business machines, to perform a pure calculating operation. Hence in cases where the operation of business machines is to be supplemented by connecting them with an electronic computer, it is generally desirable to assign a single computer to two or more business machines in order to take advantage of the high operating speed of the computer. It is then necessary to provide interlocking control means that permit only one of the business machines to cooperate at a time with the electronic computer for the purpose of entering factorial amounts into the computer and taking the computed products or results out of the computer. While the computer is thus occupied by one business machine, a simultaneous operative connection of the computer with one or more of the other business machines must be prevented.

A known business-machine control system of the just-mentioned type comprises a multiplicity of relays for selectively coupling a plurality of electro-mechanical business machines with the computer under control by special latchable keys of the respective business machines which act upon an automatically progressing stepping-switch whose stepping mechanism connects only one of the respective business machines with the computer at a time. This system not only requires a large number of components which render it excessively susceptible to trouble, but also consumes a considerable amount of time for the selective control by means of the stepping switch, thus greatly increasing the total period of time required for a complete cycle of computing operation. Furthermore, the necessity for actuating the above-mentioned special keys requires additional attention on the part of the personnel.

It is an object of my invention to provide a control system for the mutually exclusive control of two or more mechanically or electromechanically operating business machines with a single electronic computer which more reliably couples and interlocks the individual business machines relative to the computer but eliminates the above-mentioned deficiencies of the known control system.

According to my invention, I provide for each business machine, within the group assigned to a single electronic computer, a set of two relays of which one controls the motor-energizing circuit of the business machine whereas the other relay performs the multiple function of effecting a pre-selection of the machine for occupation of the computer, opening the connecting circuits from the computer to the other business machines of the group, and coupling the value registering mechanisms of the selected machine with the electronic computer.

These and other features of my invention, set forth in the claims annexed hereto, will be described in the following with reference to two embodiments of control systems according to the invention illustrated by way of example in the accompanying drawings, in which:

FIG. 3 is a schematic top view of two business machines for cooperation with the single computer in accordance with the circuit diagram of FIG. 1.

Figure 1:
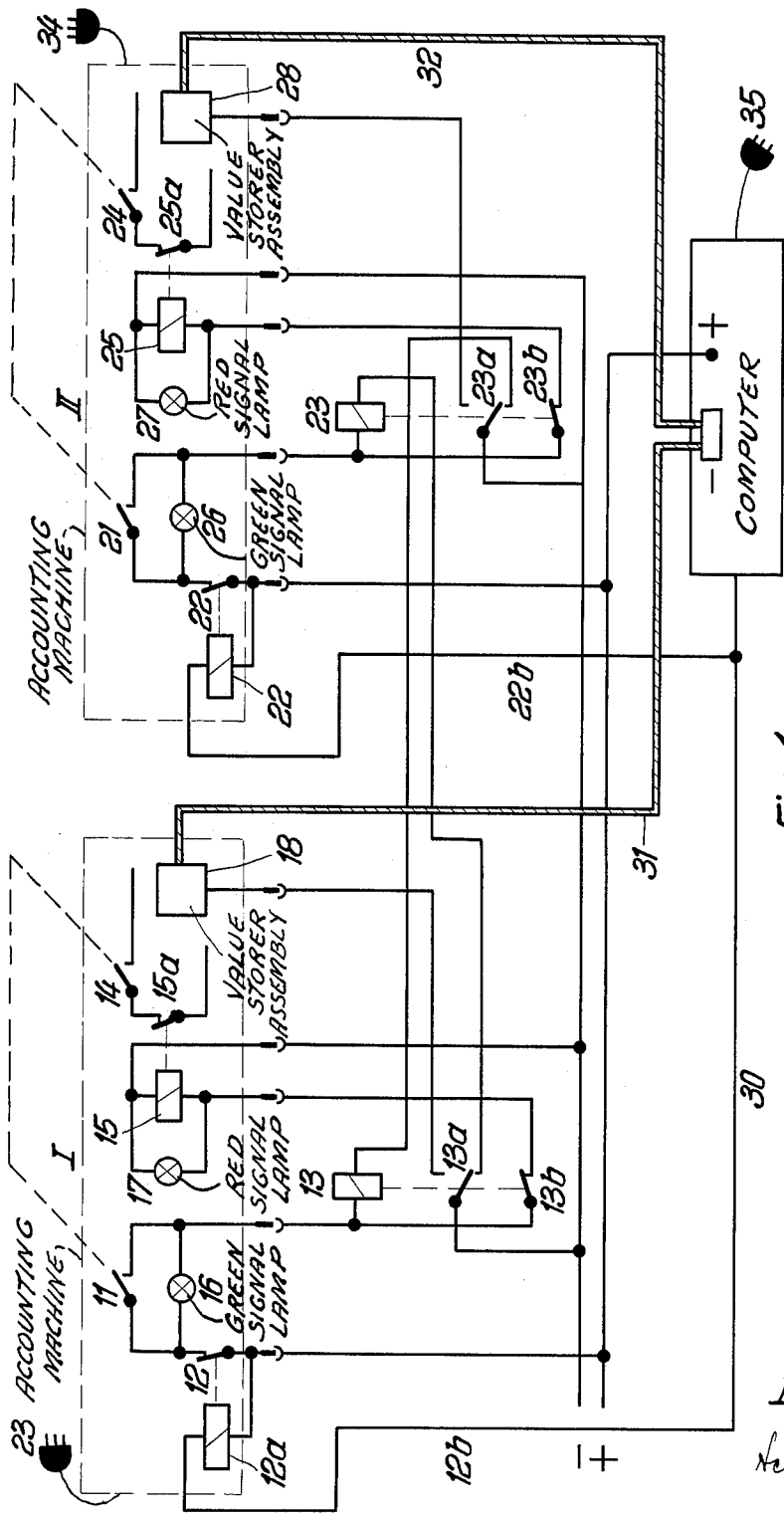
FIG. 1 is the circuit diagram of a control system connecting two business machines I, II with an electronic computer C.

Before dealing with the invention proper, it will be helpful to understand that the business machines I, II, III illustrated and described herein are accounting machines whose data posting and entering devices as well as the totalizing and balance registering devices are of the mechanical type, and in which the entered or registered values are available in digital form at respective electric leads or terminals. Any such business machines as generally known and conventional are applicable. For example, the invention has been employed in connection with accounting machines available in the trade from Anker-Werke A.G., Bielefeld, Germany, under the type designation BN 500. Details of such machines are known, for example, from U.S. Patents No. 2,681,618, No. 2,698,660, No. 2,787,953, No. 2,825,561, and No. 2,765,116, the latter patent showing data storing mechanisms with digital electric value circuits of the type mentioned above. Such machines are further described in Patent No. 3,012,717 and in the copending application Serial No. 85,107, filed January 26, 1961, now Patent No. 3,221,156 (by H. Engstfeld and H. Plate for Interest-Computing Apparatus), all of these patents and applications being assigned to the assignee of the present invention. It will be understood, of course, that the accounting or other business machines to be used for the purposes of the present invention are to some extent modified by providing the motor control key with a special contact and by the provision of the above-mentioned relays and appertaining circuit connections, as described below with reference to the drawings.

The electronic computer denoted by C in the drawings may likewise consist of any known electronic digital computer. Such computers are available, for example, from the above-mentioned source under the type designation TR10,000. This is a transistorized computer which can be used for the purposes of the invention without change and for that reason is described herein only with respect to its connection with the other components of the control system according to the invention. The computer is of the digital type having for each digit a group of ten input wires, the digit value being determined by which of the ten leads in each digit groups is energized at a time. The output of such a computer is likewise available in digital form, each digit being constituted by a group of ten output terminals so that the digit value is determined by which one of these terminals is energized at a time.

With respect to an example of computing operations to be performed by such a computer under control of a business machine, reference may be had to the above-mentioned copending application Serial No. 85,107. The computing operation may consist in a simple multiplication of two factors that are entered into the computer from the data storer means of the business machine, such as a factor indicating an amount of capital, and another factor indicating the rate of interest. The computer then furnishes a product indicative of the total amount of interest, this product being entered and registered in the business machine.

Referring first to the schematic top view in FIG. 3, there is shown two accounting machines I and II and the respective operators' seats 36 and 37. The two accounting machines are energized through flexible cords and respective connector plugs 37 and 34 from outlets of a utility power line in the conventional manner. The two accounting machines I, II are further connected by respective multi-wire cables 31 and 32 with the terminal assembly of the electronic computer C which is separately energized from another power-line outlet through a connector plug 35. The control system according to the invention, as shown in FIG. 1, serves to make certain that only one of the two business machines I, II is in active connection with the computer at a time, whereas the other business machine remains electrically blocked from the computer and can occupy the computer only when the computation work for the first-active business machine is completed.

Figure 1A:
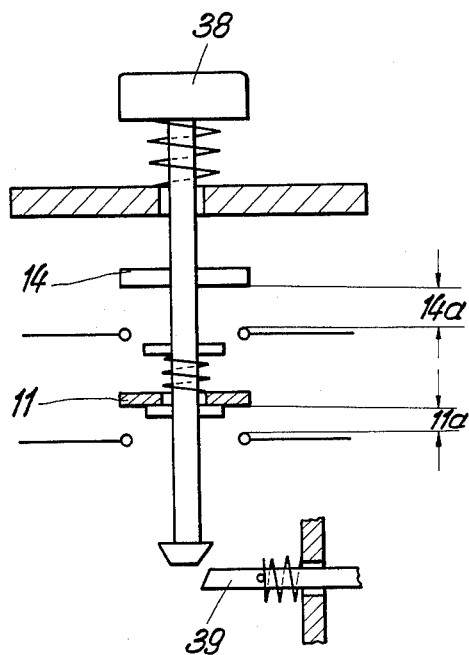
FIG. 1a shows schematically a motor-control key which forms part of each of the business machines in FIG. 1.

Each of the two business machines I, II comprises at least one conventional motor control key which, when depressed, causes energization of the drive motor for performing a machine run. Such a motor control key is shown in FIG. 1a at 38. It is provided with a normally open main contact 14 which when closed, completes the motor energizing circuit through a normally closed relay contact 15a in machine I. The machine II has an identical motor control key with a normally open main contact 24 which, when closed, completes the motor control circuit through a normally closed relay contact 25a. For the purposes of the present invention, each of these motor control keys is provided with a preselector contact 11, 21 (FIGS. 1a, 1) which is coupled with the motor control key 38 in such a manner that when the key is being depressed the preselector contact 11 closes earlier than the main contact 14, namely after the selector contact 11 has traveled through a shorter distance 11a than the distance 14a needed for the main contact 14 to close. When the key is depressed, it is retained by a latch 39 which is released at the end of the machine run. The selector contact 11, 21 then opens shortly before the motor control key opens the main contact and reaches its normal position of rest. Connected parallel to the respective contacts 11 and 21 is a green signal lamp 16 or 26 (FIGS. 1, 3) which when lit indicates to the operator that the machine is ready to be started.

Assume that the operator depresses the motor key in machine I and thereby closes the preselector contact 11. Then the signal lamp 16 is extinguished and a relay 13 is energized through closed contact 11 between the positive and negative leads of a direct-current supply. Relay 13 switches its contacts 13a and 13b from the illustrated positions. The contact 13a then interrupts the connection of a relay 23 in the other machine II with the minus pole of the feeder voltage so that the relay 23 cannot become energized and the normal connections through the relay contacts 23a and 23b remain preserved. Simultaneously, the contact 13a applies voltage to the value storer assembly 18 of the machine I thus initiating the value transmission between the machine I and the electronic computer C.

The normally closed contact 23b of relay 23 for machine II prepares a circuit for a relay 25, likewise correlated to the machine II. When the motor key in machine II is actuated and closes its preselector contact 21, the relay 25 opens its contact 25a and thereby interrupts the motor control circuit of machine II until after the computer C is no longer occupied by the machine I. Simultaneously with the response of relay 25, a red signal lamp 27 on machine II (FIGS. 1, 3) is lit in order to indicate to the operator of machine II that the computer is occupied elsewhere for a short interval of time.

Together with the issuance of the computed result from the computer C to value registering assembly 18 of machine I, the computer issues a control pulse through a connecting line 30 which, acting upon a relay 12a, opens a contact 12 in series with the preselector contact 11. Contact 12 interrupts the energizing coil circuit of relay 13 before the motor key of machine I passes back to its position of rest. The relay 12a may also cause releasing of the latch 39 shown in FIG. 1a. The relay 13 then drops off, and its contacts 13a and 13b move back to the normal positions shown in FIG. 1. This has the effect, that the electronic computer C is not occupied during the entire registering operation of the business machine but only for the much shorter duration of the electronic computation including the transmission of data to and from the computer.

If, during the above-described machine operation, the motor key of machine II was also depressed and latched in depressed position, then the contact 21 of the motor key prepares the energizing coil circuit for relay 23. When the contact 13a drops back to its normal position upon completion of the electronic computation for machine I, the relay 23 is simultaneously put on voltage and will immediately actuate its contacts 23a and 23b. This has the result that the coil circuit of relay 13, extending through the contact 23a, is opened and that the data registering assembly 28 of machine II is supplied with voltage. The actuation of contact 23b opens the circuit for relay 25. Contact 25a closes and thus completes the motor control circuit for machine II. The further operations then take place in accordance with those described above with reference to machine I (except that the above-mentioned reference characters are to be correspondingly replaced, for example 15 is to be replaced by 25, or 12 to be replaced by 22).

By virtue of the above-described operation, only one business machine at a time is actively coupled with the electronic computer. On the other hand, any value entered or available in the machine not coupled with the computer is kept in readiness and need not be repeated because the machine remains preselected and is actively coupled with the computer automatically in dependence upon the cessation of the computing operation then being performed for the other machine. In this manner, a rapid operation of the computer and thus a good economical utilization with a minimum of susceptibility to trouble is afforded.

Figure 2:
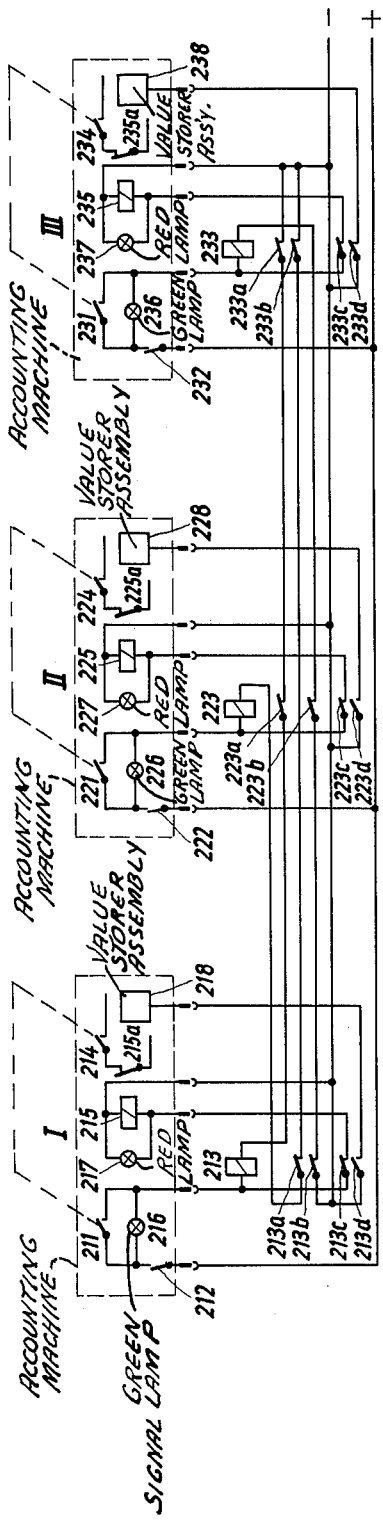
FIG. 2 is the circuit diagram of a similar control system for selective connection of three business machines I, II, III with a single computer C.

A control system according to the invention as exemplified above with reference to FIG. 1, is applicable with any desired number of business machines that are to cooperate with a single electronic computer. Thus FIG. 2 shows a control system for the mutually exclusive coupling or control of three business machines I, II and III. The computer, not shown in FIG. 2, is connected with each business machine by a multi-wire cable in the same manner as described with reference to FIG. 1, and the performance of the system, in principle, is also as described above with reference to FIG. 1. To facilitate a comparison, the reference numerals for machines I and II in FIG. 2 correspond to those of FIG. 1 except for a prefixed "2"; and the circuit components relating to the business machine III are denoted by numerals beginning with 231 and differing by the value 10 from the numerals employed for machine II in FIG. 2.

In accordance with the greater number of business machines to be selectively coupled with the computer, the relays 213, 223 and 233 are each provided with four contacts, such as those denoted by 213a, 213b, 213c and 213d. Assume, for example, that the machine II is first put in operation by depression of its motor control key which closes the main contact 224 and the preselector contact 221. The relay 223 picks up and opens at its contact 223b the coil circuit for relay 233. At the same time the relay 223 opens at contact 223a the coil circuit for relay 213. Upon termination of the computing operation in the computer, the transmission of the computed result to the data assembly 228 of machine II is accompanied by a pulse which, as explained with reference to FIG. 1, opens the contact 222 in the coil circuit of relay 223. If at this moment the two other machines I and III have closed their respective preselector contacts the one machine will start first whose relay 213 or 233 has the shorter time constant of response. The characteristics of the respective relays, therefore, can be so adapted that in the event two or three machines are simultaneously placed in condition for coaction with the computer, only one of them will start whereas the others will remain blocked until the first computing operation is completed.

The advantages of improved utilization of the computer and reduced waiting periods will be realized if one considers that a calculating operation can be performed by an electronic computer within an almost negligible interval of time, for example about 30 milliseconds, as compared with a registering operation of the business machines. Hence any waiting period that may elapse between actuation of the motor key and the release of the computer by another business machine of the group, this waiting interval being apparent from lighting of the lamps 17, 27, will at most amount to a small fraction of one second. Consequently, any such waiting time is too short to appreciably affect the work to be done by the business machines and the operating personnel. On the other hand, the computer, constituting a relatively great investment, is utilized to a considerably better extent by being available to several business machines.

It will be obvious to those skilled in the art, upon study of this disclosure, that a control system according to my invention can be modified as regards circuit components and circuit connections, and hence may be given embodiments other than particularly illustrated and described herein, without departing from the essential features of my invention and within the scope of the claims annexed hereto.

I claim:

1. With an electronic computer and a plurality of business machines for coaction with said computer, each of said machines having mechanical value storer means and electric circuit means connecting said storer means with said computer, and each of said machines having a motor circuit for causing, when energized, operation of said storer means and said computer through said circuit means, said computer providing a signal upon completion of operation with a business machine, in combination, a control system for selective feeding of said computer by said respective business machines, said control system comprising first and second relays for each of said respective business machines, and starting switch means in each of said respective business machines for completing said motor circuit and energizing at least one of said relays, a motor switch connected in each said motor circuit for selectively energizing and deenergizing the corresponding motor circuit, the first relay of each of said business machines controlling the motor switch of the motor circuit of the corresponding business machine, a first energizing circuit for energizing each said first relay, a first energizing switch in each said first energizing circuit for selectively energizing and deenergizing the corresponding first relay, the second relay of each said business machines having a second energizing circuit for energizing each said second relay, a second energizing switch in each said second energizing circuit for selectively energizing and deenergizing the corresponding second relay, each of said first energizing switches being operated by the second relay of the corresponding business machine and each of said second energizing switches being operated by the second relay of each of the others of said business machines whereby when the second relay of one of said business machines is in a condition maintaining the corresponding storer means in circuit, the first relay of said one of said business machines is in a condition maintaining the corresponding motor switch in motor circuit energizing condition and the first and second relays of the others of said business machines are in their opposite respective conditions so that their corresponding motor circuits are deenergized, and means for applying the signal provided by said computer to the first and second energizing circuits of each of said business machines thereby to change the first and second relays of said one of said business machines to their opposite respective conditions upon completion of operation of said computer and said one of said business machines to deenergize the corresponding motor circuit and to change the first energizing circuit of each of the others of said business machines to its initial condition in which it is operable to energize the corresponding first relay.

2. In a control system as claimed in claim 1, wherein said starting switch means comprises a manual switch in the first and second energizing circuits of each of said business machines and a manual switch in the motor circuit of each of said business machines.

3. In a control system as claimed in claim 2, wherein the first relay of said one of said business machines is in its deenergized condition and the corresponding motor switch is closed while the first relay of each of the others of said business machines is in its energized condition and the corresponding motor switch is open, and the second relay of said one of said business machines is in its energized condition while the second relay of each of the others of said business machines is in its deenergized condition, the first energizing switch of said one of said business machines being open while the first energizing switch of each of the others of said business machines is closed and the second energizing switch of said one of said business machines being closed while the second energizing switch of each of the others of said business machines is open.

References Cited by the Examiner

UNITED STATES PATENTS 2,922,084 1/1960 Franz _____ 317—136 X
3,079,590 2/1963 Confeld et al.

OTHER REFERENCES

Pages 243–244, 1945, Packard, Relay Engineering, published by Struthers-Dun, Inc.

ROBERT C. BAILEY, *Primary Examiner.*

NEIL C. READ, *Examiner.*

G. E. MEYERS, W. M. BECKER, P. L. BERGER,
*Assistant Examiners.*